US009896015B2

(12) United States Patent
Neveu et al.

(10) Patent No.: US 9,896,015 B2
(45) Date of Patent: Feb. 20, 2018

(54) VEHICLE DOLLY

(71) Applicant: ADESA Auctions Canada Corporation, Mississauga (CA)

(72) Inventors: Ghyslain Neveu, Brownsburg (CA); Benoit Castonguay, Saint-Eustache (CA)

(73) Assignee: ADESA AUCTIONS CANADA CORPORATION, Mississauga, Ontario (CA)

(*) Notice: Subject to any disclaimer, the term of this patent is extended or adjusted under 35 U.S.C. 154(b) by 0 days.

(21) Appl. No.: 15/087,685

(22) Filed: Mar. 31, 2016

(65) Prior Publication Data
US 2017/0282776 A1    Oct. 5, 2017

(51) Int. Cl.
*B60P 3/07*    (2006.01)
*B60P 3/077*   (2006.01)
*B60P 3/12*    (2006.01)

(52) U.S. Cl.
CPC ............... *B60P 3/077* (2013.01); *B60P 3/127* (2013.01)

(58) Field of Classification Search
CPC .................... B60P 3/07; B60P 3/073–3/077
See application file for complete search history.

(56) References Cited

U.S. PATENT DOCUMENTS

| | | | | |
|---|---|---|---|---|
| 3,035,812 A | * | 5/1962 | Wineteer | B60P 3/127 254/2 R |
| 3,521,771 A | * | 7/1970 | Nowell | B60P 3/127 280/444 |
| 4,003,583 A | * | 1/1977 | Stanzel | B60P 3/04 280/414.1 |
| 4,050,597 A | * | 9/1977 | Hawkins | B60B 29/002 414/427 |
| 4,123,038 A | * | 10/1978 | Meyers | B66F 9/06 254/134 |
| 4,763,914 A | * | 8/1988 | Lemmons | B62D 63/061 280/401 |
| 5,727,920 A | * | 3/1998 | Hull | B60P 3/127 280/402 |
| 6,106,214 A | * | 8/2000 | Saffelle | B60B 29/002 414/427 |
| 8,387,953 B2 | * | 3/2013 | Drake | B66F 7/025 187/208 |
| 8,876,140 B2 | * | 11/2014 | Barnett | B60P 3/075 280/401 |

* cited by examiner

*Primary Examiner* — Kevin Hurley
(74) *Attorney, Agent, or Firm* — Brinks Gilson & Lione

(57) ABSTRACT

A frame of a vehicle dolly includes a wheel cradle opening to receive a wheel of a vehicle to be towed. A hinged member is pivotally attached to the frame and is movable between an open position and a closed position to form part of a wheel cradle. A hinge activation device contacts the wheel within the wheel cradle opening and responsively moves the hinged member toward the closed position. The frame of the vehicle dolly is vertically slidably coupled to an axle assembly such that the frame can be raised and lowered. An extension member may extend from the frame and receive a tow truck stinger member, wherein the frame can be raised or lowered under motive force of the stinger member.

17 Claims, 11 Drawing Sheets

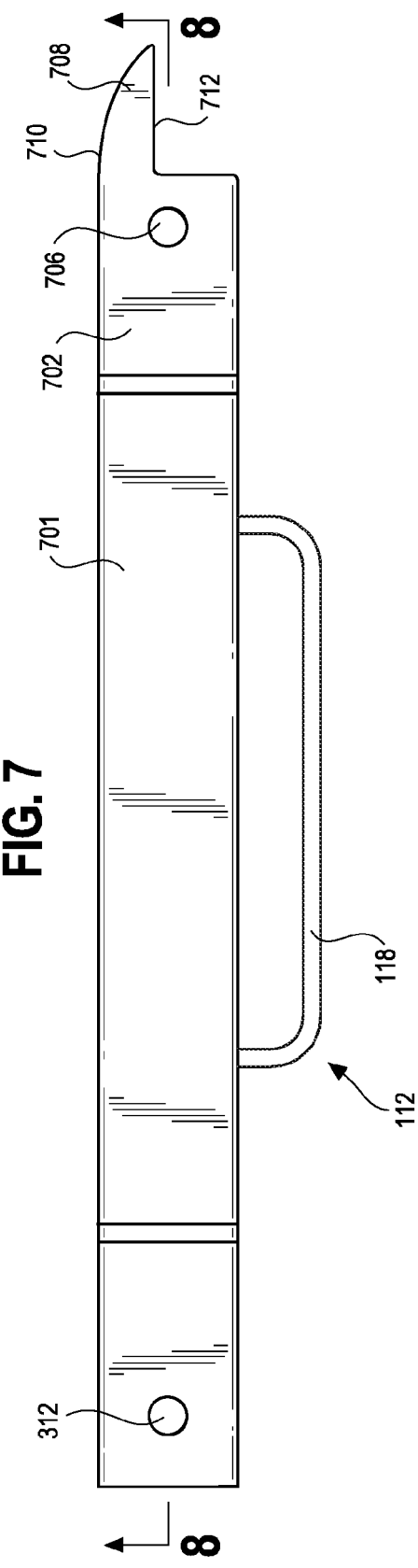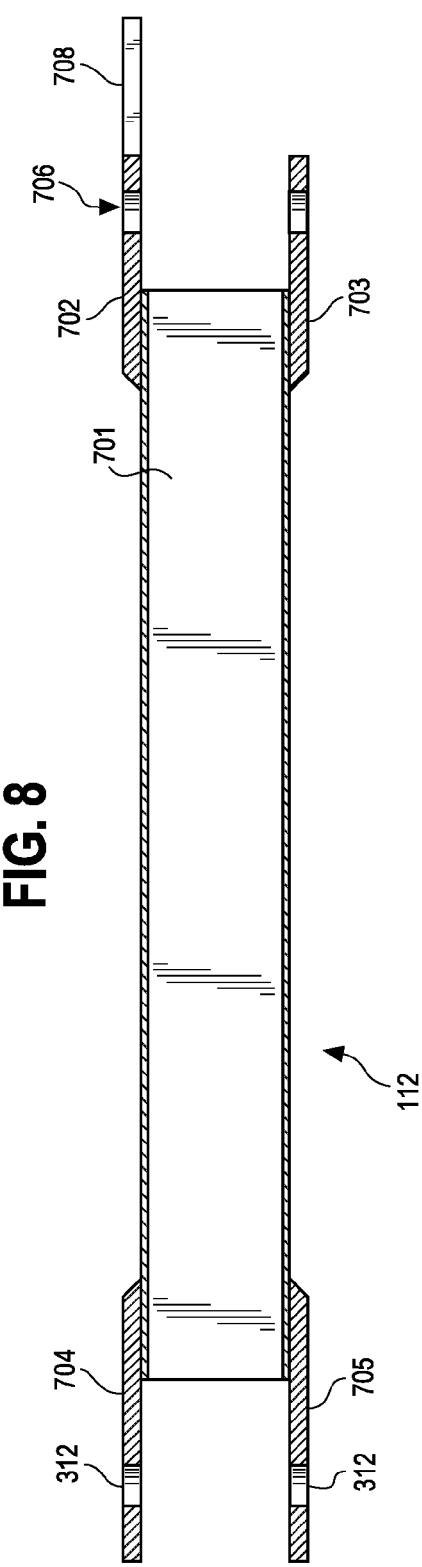

VEHICLE DOLLY

TECHNICAL FIELD

This disclosure generally relates to a vehicle dolly, and more specifically to a vehicle dolly for towing a vehicle.

BACKGROUND

Vehicle dollies (also called carrier dollies or tow cradles) are used to elevate wheels of a vehicle, typically along a single axle, off of the ground so as to enable towing of the vehicle. In one example, the vehicle dolly is unpowered and designed to connect to a tractor, truck or prime mover vehicle with strong traction power.

BRIEF DESCRIPTION OF THE DRAWINGS

FIG. 7 shows a top view of the hinged member of the vehicle dolly of FIG. 1.

FIG. 8 shows a side cross-sectional view of the hinged member of FIG. 7.

DETAILED DESCRIPTION

Figure 1:
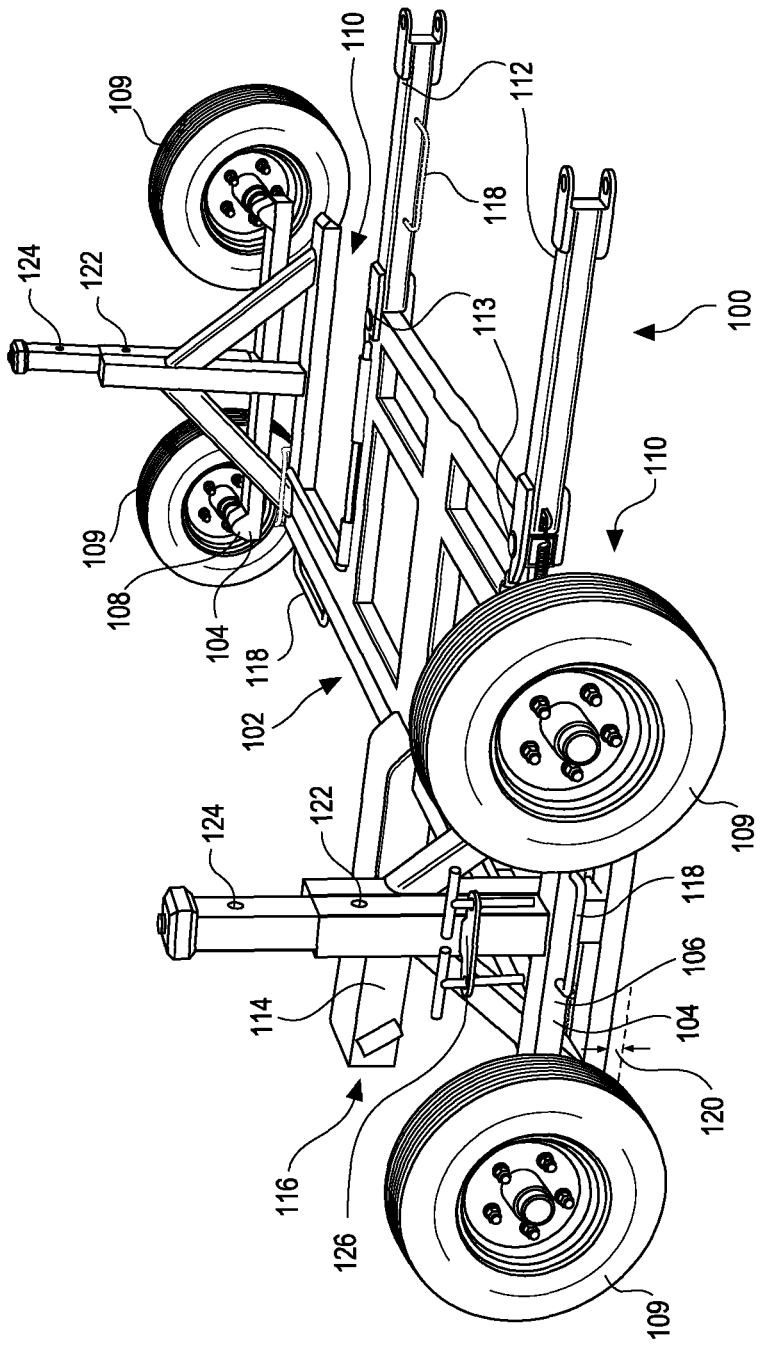
FIG. 1 shows an example vehicle dolly.
Figure 2:
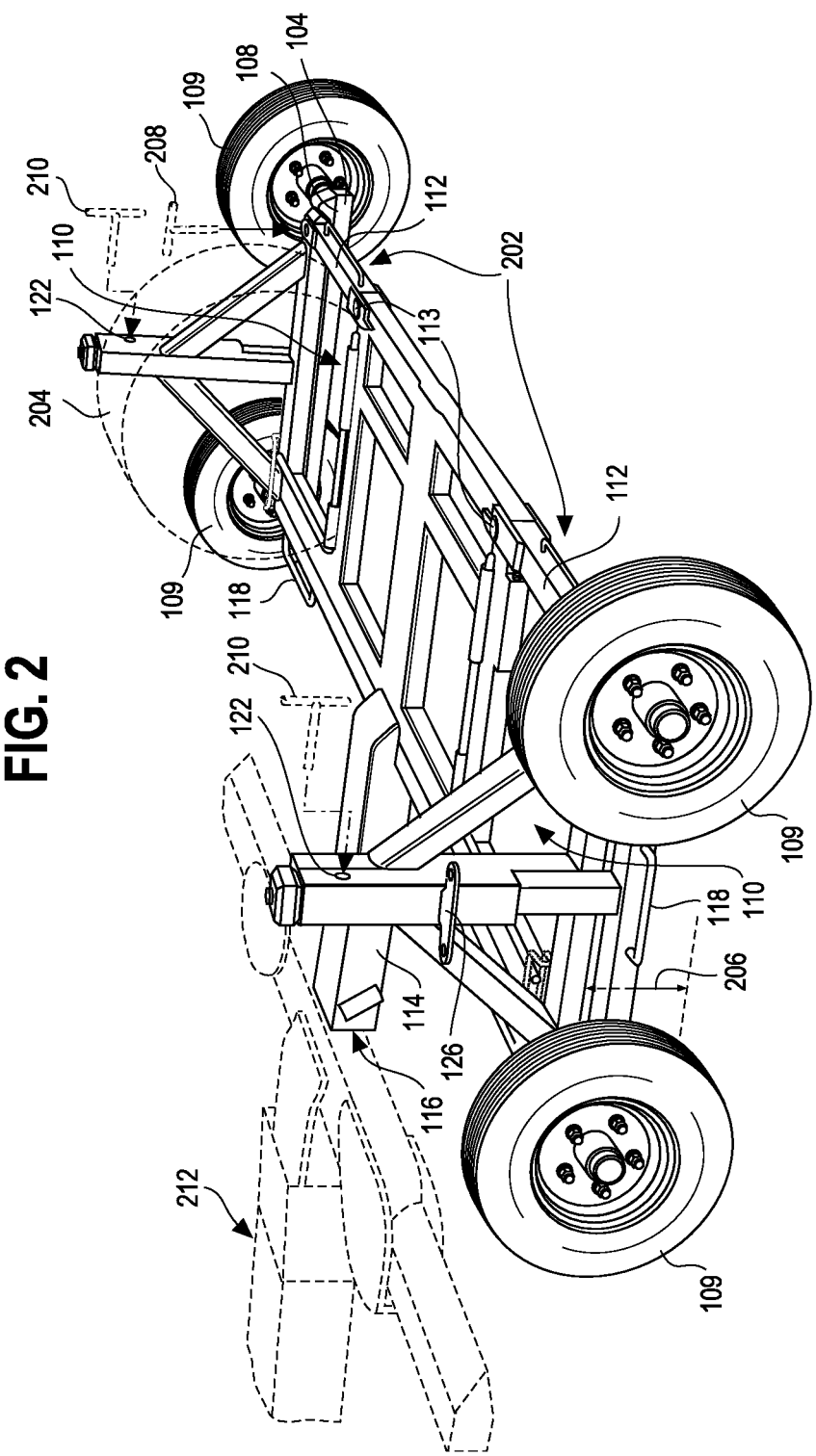
FIG. 2 shows another view of the example vehicle dolly of FIG. 1.

A vehicle dolly is illustrated in the accompanying figures in accordance with various embodiments. FIG. 1 shows the example vehicle dolly 100 in a lowered position. FIG. 2 shows the same example vehicle dolly 100 in a raised position. In operation, while the vehicle dolly 100 is in the first lowered state, the vehicle dolly 100 can be slid under an axle of a vehicle to be towed (e.g., a font axle or a rear axle). The wheels of the vehicle to be towed enter into the wheel cradle openings 110 of the frame 102 as the vehicle dolly 100 is rolled rearward (e.g., from left to right in FIGS. 1 and 2). Once the vehicle wheels are within the wheel cradle opening 110, the hinged members 112 can be closed about the wheels and locked into place (e.g., with locking pins 208) to form wheel cradles 202 (see FIG. 2) that capture and support the wheels of the vehicle to be towed. Once the hinged members 112 are locked closed, the vehicle dolly 100 can be raised from the first lowered position (shown in FIG. 1) to the second raised position (shown in FIG. 2), for example, with a tow truck. Once in the raised position, the vehicle dolly 100 can be locked into the raised position (e.g., with locking pins 210) such that the wheels (e.g., of one axle) of the vehicle to be towed are elevated off of the ground and supported by the frame 102 of the vehicle dolly 100 without further assistance from the tow truck. The tow truck can then subsequently be used to raise the opposite axle of the vehicle off of the ground such that the entire vehicle to be towed is elevated in a suitable fashion to be relocated.

In this manner, a tow operator is not required to carry, manipulate, or assembly heavy dolly assemblies at inconvenient or uncomfortable locations (e.g., on the ground and/or under a vehicle). Further, the vehicle dolly 100 is elevated to the raised position by force of the tow truck and not by a breaker bar manually operated by the tow operator. Thus, the procedure to elevate the vehicle to be towed with the improved vehicle dolly 100 is quicker, more efficient, and safer.

Conversely, in one prior example of a vehicle dolly, a tow operator must place two axle tubes under a vehicle to be towed in the field, one axle tube directly in front of the subject wheels and the other directly behind the subject wheels. The tow operator must then connect the ends of each axle tube to one of two wheel assemblies (one for each side of the vehicle to be towed). Then, the tow operator must use a long breaker bar (e.g., for leverage) in two separate operations to pivot two portions of the wheel assemblies to elevate the vehicle. This process must then by repeated again for the opposite side.

Though suitable for some situations, such prior vehicle dollies may not be suitable for all application settings, environments, and users. For example, assembling such a vehicle dolly in the field can be time consuming, uncomfortable, and exhausting. Prior vehicle dollies require the tow operator to perform many operations on or near the ground level. Further, the separate unassembled assemblies of the tow dolly may be relatively heavy (e.g., axle tubes weighing in excess of 35 pounds and each wheel assembly weighing in excess of 80 pounds) and require transportation and assembly by hand. In addition to the inconvenience a tow operator faces in simply moving and assembling prior vehicle dollies, the operator must subsequently exert force on a breaker bar to leverage the vehicle dolly in the elevated position. The force must be exerted over a large range (typically in an arc from an upright position to the ground) and can be substantial. Further, if the tow operator loses grip during the elevation step, the breaker bar can return violently toward its starting position, possibly injuring the tow operator or another, or causing damage to the vehicle to be towed, the vehicle dolly, or surrounding property. The potential dangers discussed above, in addition to the wearisome operations performed in uncomfortable positions close to the ground and the heft of the assemblies, may lead to injuries and/or operator fatigue.

Many of the above-described inefficiencies and inconveniences are reduced or eliminated with the vehicle dolly described in the present disclosure. These and other benefits can be better understood with a more detailed study of the figures and the following description.

As is shown in FIGS. 1 and 2, in various embodiments, the vehicle dolly 100 includes the frame 102 and a pair of axle assemblies 104. The frame 102 is vertically slidably connected to the axle assemblies 104. The frame 102 is vertically slidably connected to a first axle assembly 106 at a first end of the frame 102 and vertically slidably connected to a second axle assembly 108 at a second, opposite end of the frame 102. The frame 102 connects to the axle assemblies 104 at the lateral ends of the frame 102 (e.g., the left side of the frame 102 and right side of the frame 102, respectively) in relation to the direction of movement of the vehicle dolly 100 (e.g., forward and backward). The axle assemblies 104 each include at least one wheel 109 rotatably connected to the axle assemblies 104. The wheels 109 support the axle assembly 104, and thus the frame 102 and the entirety of the vehicle dolly 100, by resting or rotating on the ground or other support surface. In one embodiment, as shown in the figures, the axle assemblies 104 each include two wheels 109 such that the vehicle dolly 100 includes a total of four wheels 109. In this configuration, the vehicle dolly 100 can remain upright and can support a vehicle on its own. In other embodiments, the vehicle dolly 100 includes at least three wheels (e.g., in a triangle or otherwise non-linear arrangement) to establish a three-pointed support plane such that the vehicle dolly 100 can remain upright and can support a vehicle on its own. Other variations are contemplated.

FIG. 1 shows the frame 102 in a lowered position relative to the wheel assemblies 104. When in the lowered position, the distance 120 between the frame 102 and the ground is small, keeping the height of the frame 102 low enough to pass under most vehicles. Conversely, FIG. 2 shows the frame 102 in the raised position relative to the wheel assemblies 104. When in the raised position, the distance 206 between the frame 102 and the ground is larger such that the height of the frame 102 is enough to elevate one or more wheels of a vehicle to be towed off of the ground.

The frame 102 includes two wheel cradle openings 110. In one embodiment, the wheel cradle openings 110 are U-shaped. Each U-shaped wheel cradle opening 110 in the frame 102 may be formed by a portion of a front member 302 (forming the bottom of the letter U), an outer lateral member 306 (forming one side of the letter U), and an inner support member 308 (forming the other side of the letter U) (see FIGS. 3, 9, 10, and 11).

Two hinged members 112 are each pivotally attached to the frame 102 at two pivot points 113 at or near the openings of the U-shaped wheel cradle openings 110 in the frame 102. The hinged members 112 are each pivotally movable between an open position, as is shown in FIG. 1, and a closed position, as is shown in FIG. 2. When the hinged members 112 are in the opened position, as is shown in FIG. 1, the wheel cradle openings 110 can receive wheels of a parked vehicle to be towed (e.g., through the opening at the top of the letter U of the wheel cradle openings 110).

When the hinged members 112 are in the closed position, as is shown in FIG. 2, the hinged members 112, in combination with the members defining the U-shaped wheel cradle opening 110, form the wheel cradles 202. More particularly, the wheel cradles 202 are formed by the hinged members 112 and portions of the front member 302 (see FIG. 3). In certain embodiments, the hinged members 112 and the front member 302 are oriented substantially parallel to each other (when the hinged members 112 are closed), and substantially perpendicular to a rolling direction of the wheel of the vehicle to be towed. The hinged members 112 may be locked in the closed position by various locking mechanisms, including, for example, a pair of locking pins 208 inserted into and through locking holes 312 of the hinged member 112 aligned with corresponding locking holes 314 of the frame 102 (see FIG. 3). When the locking pins 208 are not in use, they can be conveniently stored in pin holder 126, as is shown in FIG. 1.

As is shown in FIG. 2, when the hinged members 112 are closed, a wheel 204 of a vehicle can be captured within and at least partly (or fully) encircled by the wheel cradle 202. The tread of the wheel 204 may contact the hinged members 112 and the front member 302 and the wheel 204, and thus a portion of the weight of the vehicle to be towed, is supported by the hinged members 112 and the front member 302 of the frame 102. In certain embodiments, the hinged members 112, the front member 302, an/or the outer lateral members 306 may include attachment bars 118 that provide places for attachment of wheel tie down straps, axle straps, wheel lasso straps, and/or ratchet mechanisms to secure the wheel 204 within the wheel cradle 110, thereby securing the vehicle being towed to the vehicle dolly 100.

With the wheels captured within the wheel cradles 202, the frame 102 can be elevated from the lowered position shown in FIG. 1 to the raised position shown in FIG. 2. In one embodiment, a wheel lift 212 (also called a spectacle lift) of a tow truck provides the motive force to elevate the frame 102 and the vehicle to be towed to the raised position through the extension member 114. More particularly, a stinger member 402 of the wheel lift 212 may be inserted into an opening 116 of the extension member 114 (see FIG. 4) to thereby provide the motive force to raise or lower the frame 102. Once in the raised position shown in FIG. 2, the frame 102 can be held in the raised position by a raised position locking mechanism. In one embodiment, the raised position locking mechanism is a pair of locking pins 210 inserted through holes 122 of vertical sleeve 410 of the frame 102 aligned with corresponding holes 124 in vertical sliding members 504 of the axle assemblies 104 (see FIGS. 4, 5, and 6). After the vehicle dolly 100 is locked in the raised position, the stinger member 402 can be removed from the extension member 114 and the vehicle dolly 100 will maintain the vehicle in the elevated position off of the ground.

Figure 3:
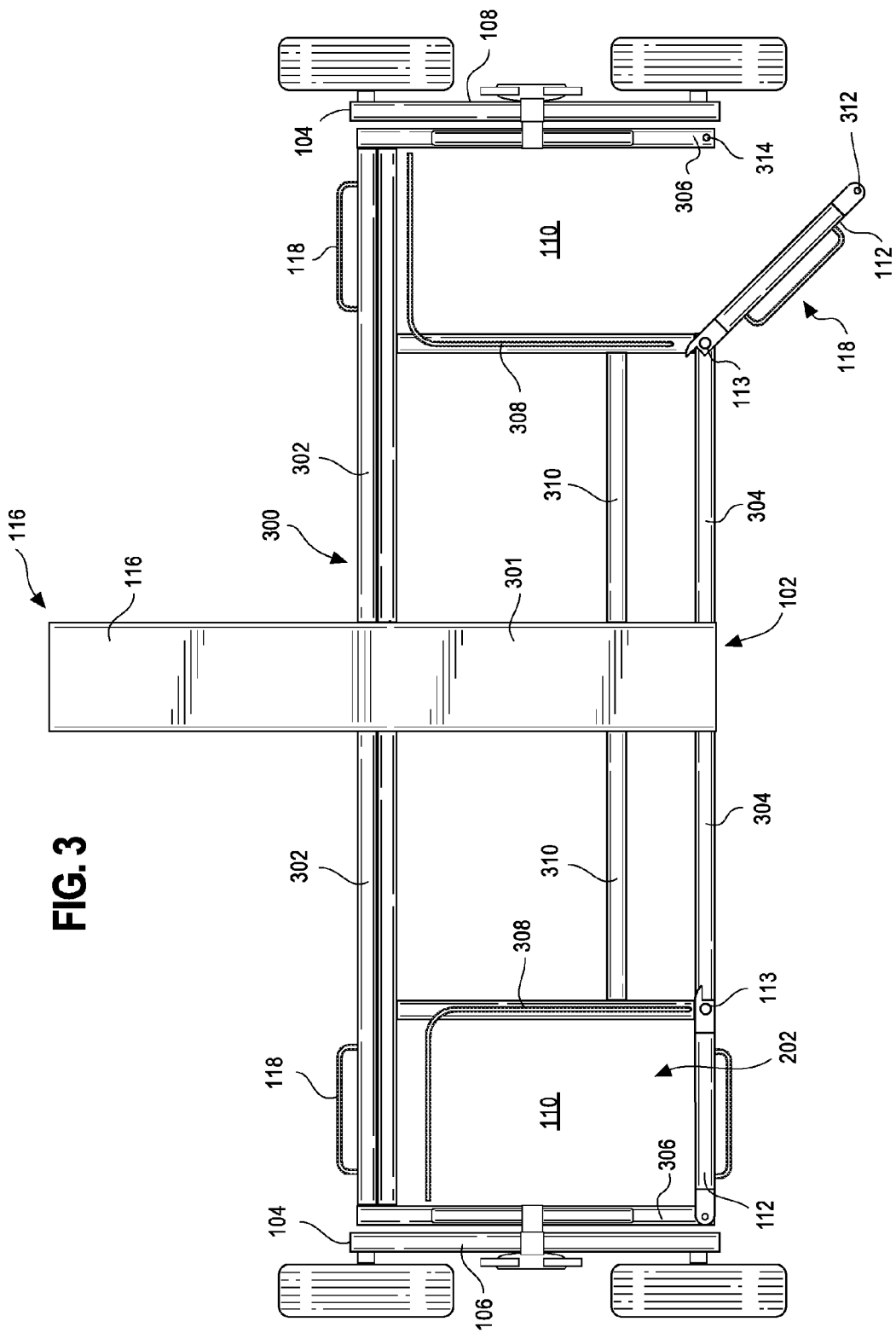
FIG. 3 shows a top view of the vehicle dolly of FIG. 1.

FIG. 3 illustrates a top-view of the vehicle dolly 100, where the front of the vehicle dolly 100 is at the top of the page. In at least one embodiment, the frame 102 includes a substantially horizontal frame portion 300 including a central member 301, front members 302, outer lateral members 306, inner support members 308, and transverse support members 310. The members of the horizontal frame portion 300 are relatively co-planar so as to maintain a low profile which can be maneuvered below a vehicle to be towed. As shown in FIG. 3, in one embodiment, the front members 302 may be attached to the central member 301 at or near a front end of the central member 301 and extending horizontally and laterally away from the central member 301. The outer lateral members 306 may be attached to the distal ends of the front members 302 and may extend backwards therefrom. The back members 304 may be attached to the central member 301 at or near the back end of the central member 301 and extending horizontally and laterally away from the central member 301, possibly in a similar fashion as and parallel to the front members 302. The inner support members 308 may extend from the front members 302 to the back members 304. The inner support members 308 may generally, though not necessarily, be oriented parallel to the central member 301. In one embodiment, additional transverse support members 310 may be provided between the central member 301 and the inner support members 308, for example, to increase the structural strength of the frame 100 while maintaining a substantially co-planar arrangement. The outer lateral members 306 may support or be integral with vertical portions 404 of the frame 102 (see FIG. 4), to which the axle assemblies 104 may be vertically slidably coupled (see FIG. 5). Although multiple front members 302, back members, 304, and transverse support members are discussed above (e.g., one for each side of the central member 301), single members may alternatively be used that span the entire length of the two separate members (e.g., a single back member 304 instead of two separate back members 304 that are intersected by the central member 301). In one embodiment, as is shown in FIG. 3, the front member 302 is made of two elongated members placed side-by-side from front to back that are welded or otherwise coupled together. Such a double assembly may help reduce torque or flex in the frame 102. The extension member 114 may extend forward from the central member 301. In one embodiment, the extension member 114 is hollow along at least a portion or a majority of its length starting at an opening 116 at the front distal end of the extension member 114. The extension member 114 may be formed, in part, from the same material segment that forms of the central member 301.

As mentioned above, the frame 102 may include the wheel cradle openings 110, which may be formed by portions of the front member 302, the outer lateral members 306, and the inner support members 308. The two wheel cradle openings 110 are spaced apart to accept two wheels of a same axle of a vehicle having a wheel track or axle track (e.g., the distance from center of one tire to the center of the other tire on the same axle) within a standard range (e.g., between 45" and 70"). Other wheel track ranges are possible with design modifications (e.g., by widening the distance between the outer lateral members 306 and/or narrowing the distance between the inner support members 308). In one example, the frame 102 is 88" wide by 26" long (excluding the extension member 114) and can accommodate a vehicle up to 84" wide (wider than the vast majority of passenger vehicles). The frame 102 includes wheel cradle openings 110 that are 20" wide by 20" long. The inner edges of the wheel openings 110 may be separated at a distance of 44" and the outer edges of the wheel openings 110 may be separated at a distance of 84" (e.g., accounting for 2" square tube framing used for the outer lateral members 306). This gives a range of approximately 40" to account for the variety of wheel track measurements on various vehicle models. Further, this wide range allows for a wide tolerance when sliding the vehicle dolly 100 under the center of a vehicle so as to ensure that each wheel is located within a respective wheel cradle opening 110. The transverse support members 310 may be offset toward the rear of the frame 102, and may be spaced from the back members 304 by a distance of, for example, 4". In at least one embodiment, various members are formed from 2" hollow metal frame stock, ¼" thick. In one embodiment, the center member 301 is 6" wide by 2" tall and is formed from 6"×2" hollow metal frame stock, ¼" thick. These measurements are provided merely as an example of one embodiment and are not intended to be limiting. Many modifications can be made to any and all measurements provided herein while still keeping within the ambit of the present disclosure.

With continued reference to FIG. 3, the hinged members 112 are pivotally attached to the frame 102 near each of the wheel cradle openings 110. When the hinged members 112 are in the closed position (shown on the left side of the frame 102 in FIG. 3), form a wheel cradle 202. The hinged member 112 on the right is shown in an open position (though not fully open) as might occur during a transition from the open position to the closed position, or vice versa. In certain embodiments, the two hinged members 112 are each pivotally attached to the inner support members 308, the back members 304, and/or the intersection of the inner support members 308 and the back members 304, at a pivot point 113. In an alternative embodiment, the two hinged members 112 are instead each pivotally attached at a pivot point along outer lateral members 306 (e.g., where locking hole 314 is shown). A hinge activation device 900 is also shown in accordance with various embodiments, which is discussed in further detail with respect to FIGS. 9, 10, and 11.

Figure 4:
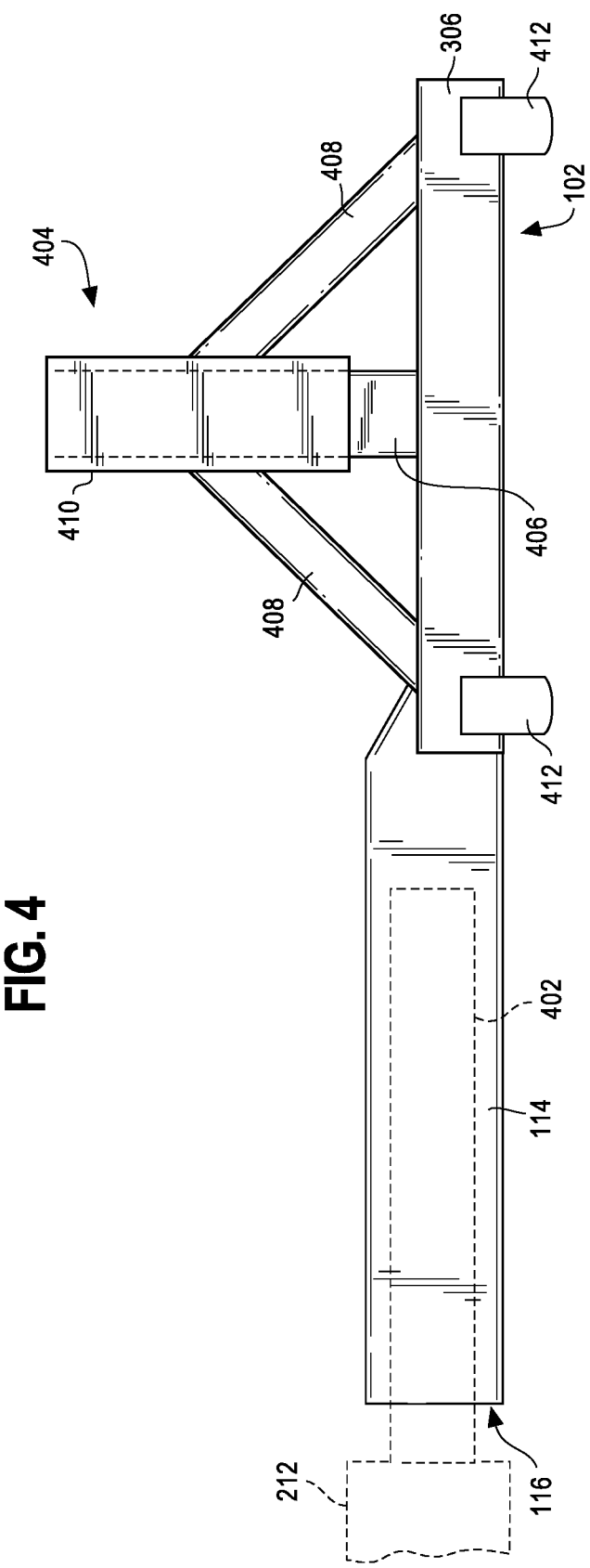
FIG. 4 shows a side elevational view of a portion of the vehicle dolly of FIG. 1.

FIG. 4 shows a side elevational view of the frame 102 and the extension member 114. The extension member 114 extends forward away from the frame 102 of the vehicle dolly 100 substantially parallel to the ground or other support surface supporting the vehicle dolly 100. The extension member 114 may extend away from the frame 102 substantially parallel to the ground or other support surface in absence of additional support (e.g., by a tow truck stinger member 402) by virtue of the fact that the vehicle dolly 100 includes at least three wheels (four wheels in some embodiments), which keep the vehicle dolly 100 upright.

The extension member 114 may be hollow at least partly along a portion or a majority of its length starting at the opening 116 at the front distal end of the extension member 114. The extension member 114 may be increased in height relative to the rest of the frame 102 (e.g., to 3½" instead of 2"). In one embodiment, such an increase in height may be achieved by removing the top wall of the frame stock that forms both the central member 301 and the extension member 114 along the segment that defines the extension member 114. A C-channel metal frame stock segment can be mated on top of the opened portion of the extension member 114, thereby increasing the height of the opening 116, for example, to 3", by a width of 5½". This size of opening 116, which can be maintained throughout all or a portion of the length of the extension member 114, can accommodate a stinger member 402 of a wheel lift 212 of a tow truck. The stinger member 402 can be inserted rearwardly into the opening 116 of the extension member 114. Once inserted, the stinger member 402 can be used to manipulate, maneuver, raise, and lower the vehicle dolly 100. For example, the frame 102 can be raised and lowered relative to the axle assemblies 104 under motive force of the stinger member 402.

The stinger member 402 is a member extending rearward from the wheel lift 212 of the tow truck. The stinger member 402 is formed by two underlift forks of the wheel lift 212 that fold together to the center of the wheel lift 212 and which appear like a stinger coming off the rear of the tow truck. As is understood in the art, when the underlift forks of the tow truck are folded together to form the stinger member 402, the wheel lift 212 of the tow truck can slide under a vehicle. The underlift forks of the wheel lift 212 can be folded outward to form wheel cradles once situated around the wheels of the vehicle to lift the vehicle by those wheels. The vehicle dolly 100 utilizes the stinger member 402 in a new and unique manner as an interface between the tow truck and the vehicle dolly 100 to manipulate, maneuver, raise, and lower the vehicle dolly 100.

FIG. 4 also shows a vertical portion 404 of the frame 102. The vertical portion 404 may be configured substantially perpendicular to the horizontal frame portion 300, with one vertical portion 404 included on each lateral side of the horizontal frame portion 300. The vertical portion 404 of the frame 102 shares the outer lateral member 306 with the horizontal frame portion 300 (e.g., as a common member involved in each portion) and/or is connected to the horizontal frame portion 300 at the outer lateral member 306. The vertical portion 404 includes a vertical member 406 connected to the outer lateral member 306 and at least one angular bracing member 408 extending at an angle between the outer lateral member 306 and an upper portion of the vertical member. In one embodiment, as is shown in FIG. 4, two angular bracing members 408 are included, one angling down and forward from the vertical member 406, and a second angling down and rearward from the vertical member 406. Such an arrangement increases rigidity and stability of the frame 102. The vertical portion 404 also includes a vertical sleeve 410 that is connected to the vertical member 406 and, in some approaches, the angular bracing members 408 and/or the outer lateral member 306. Guide tabs 412 may be attached to the outer surface of the outer lateral member 306 to prevent interference between the outer lateral member 306 and the axle assembly 104.

Figure 5:
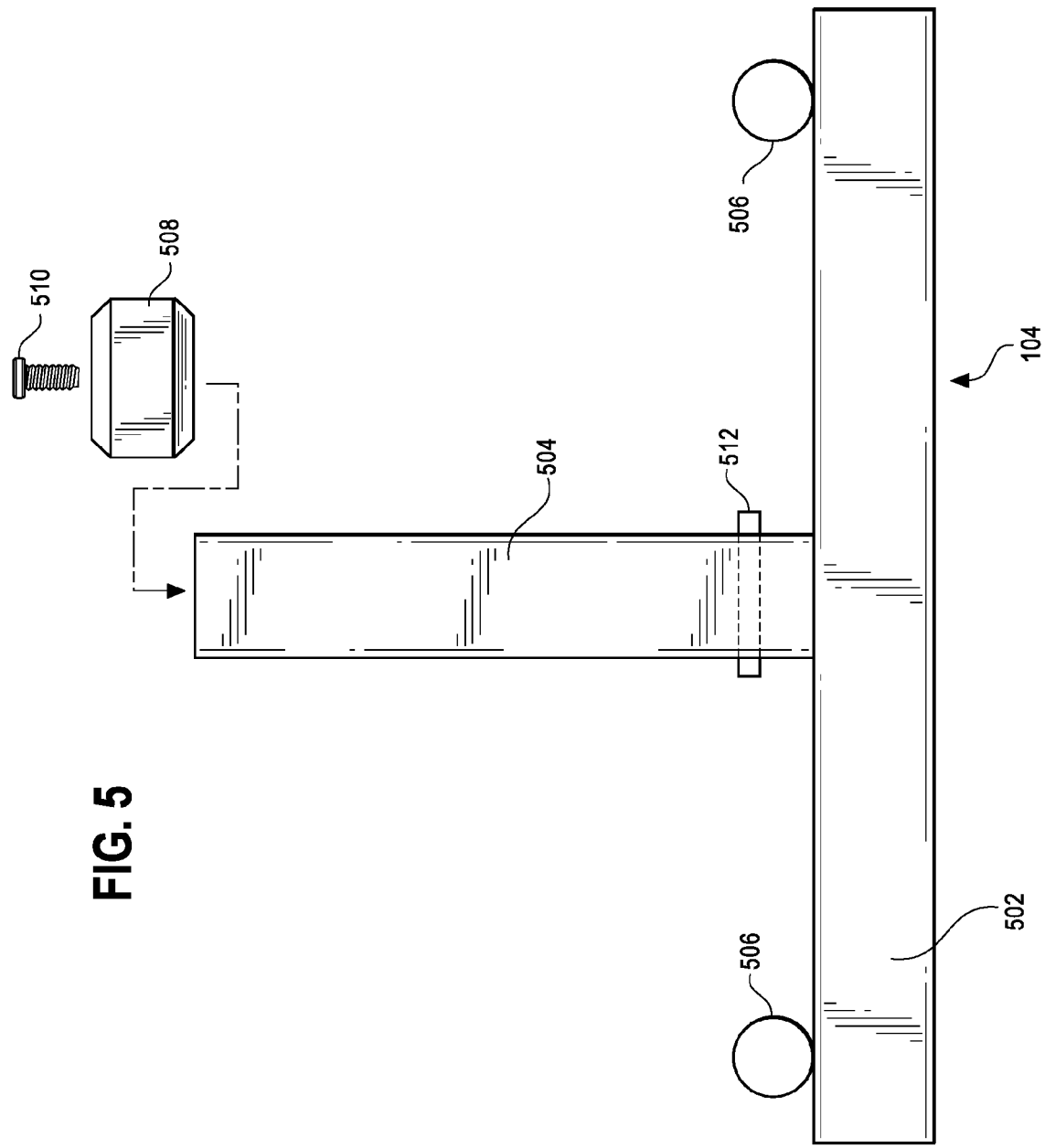
FIG. 5 shows an axle assembly of the vehicle dolly of FIG. 1.

FIG. 5 illustrates an axle assembly 104 without any wheels 109 attached. The axle assembly 104 includes a wheel support member 502 and a vertical sliding member 504 connected to the wheel support member 502. The wheel support member 502 is substantially horizontal and perpendicular to the vertical sliding member 504. The wheel support member 502 includes one or more wheel axles 506 corresponding to the number and location of wheels 109 for each axle assembly 104. The axle assembly 104 also includes a top cap 508 which may be coupled to the top of the vertical sliding member 504 by a fastener 510 such as a bolt or screw. In one embodiment, the vertical sliding member 504 includes a lower stop 512 situated at a location near the wheel support member 502.

Figure 6:
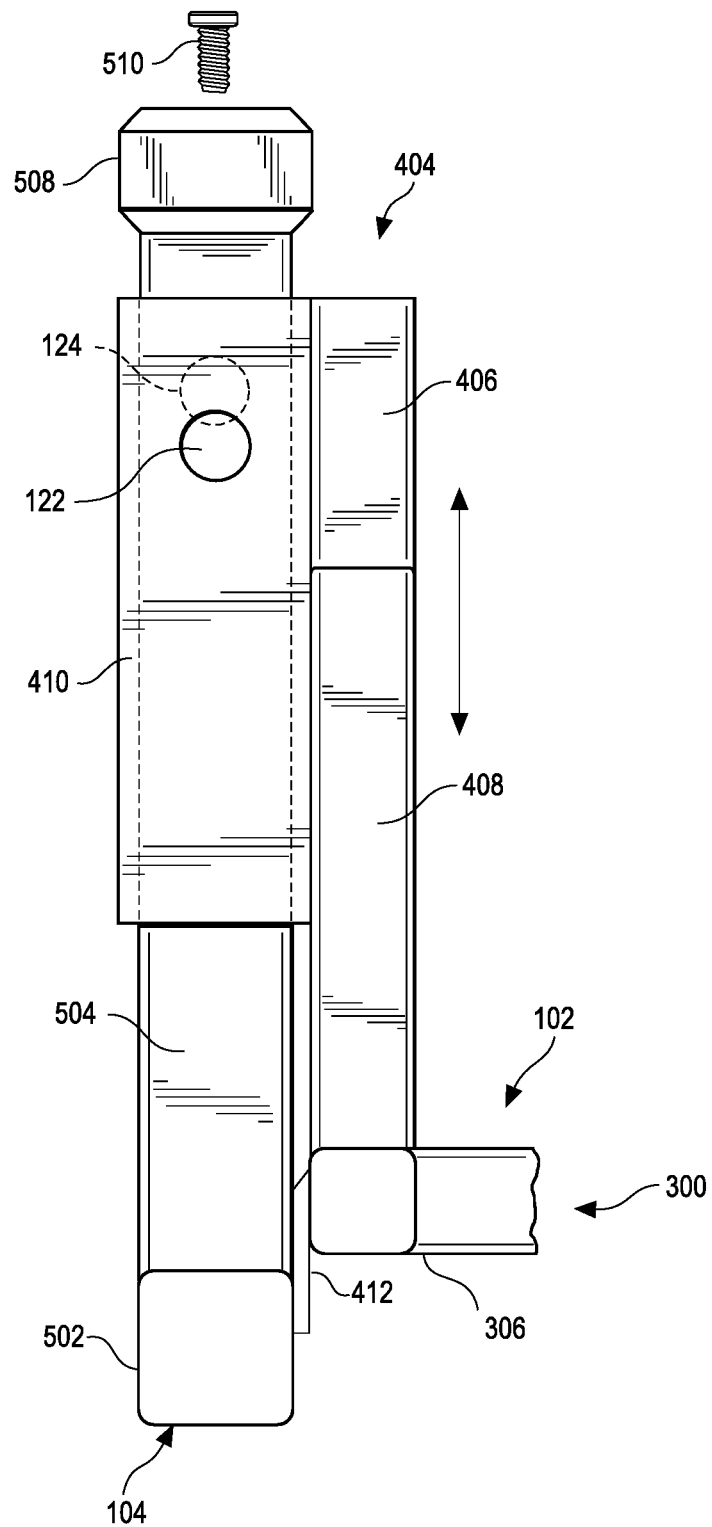
FIG. 6 shows an elevational view of a frame and axle assembly as viewed from the front or the back.

FIG. 6 illustrates an elevational view of the frame 102 and axle assembly 104 as viewed from the front or the back. The vertical sliding member 504 of the axle assembly is slidably captured within the vertical sleeve 410 of the frame 102. In this configuration, the vertical sliding member 504 can slide within the vertical sleeve 410 and slide vertically relative to the vertical sleeve 410. Reciprocally, the vertical sleeve 410 can slide vertically relative to the vertical sliding member 504. The vertical sliding range of the vertical sleeve 410 relative to the vertical sliding member 504 is limited by the top cap 508 at the top of the vertical sliding member 504 and the wheel support member 502 at the bottom of the vertical sliding member 504 (or the optional lower stop 512, if used). When the frame 102 is elevated to the raised position (e.g., by a tow truck), the top of the vertical sleeve 410 will encounter the bottom of the top cap 508, which will prohibit further sliding of the vertical sleeve 410 relative to the vertical sliding member 504. If the frame 102 is raised beyond this point (e.g., by the tow truck), one or both wheels 109 of one or both axle assemblies 104 may also rise off of the ground, which is generally not problematic as long as the frame 102 is not raised to a point where it may tip over.

When the frame 102 is elevated to the raised position, the raised position locking mechanism will lock the frame 102 in the raised position. In one embodiment, the raised position locking mechanism includes the hole 122 in the vertical sleeve 410 that aligns with the hole 124 in the vertical sliding member 504. A locking pin 210 is then pushed through the holes 122 and 124 to lock the frame 102 in the raised position, as is illustrated in FIG. 2. In an alternative embodiment, a spring-loaded catch may automatically insert a pin or bolt through the holes 122 and 124 when aligned to lock the frame 102 in the raised position.

To lower the frame 102 back to the lowered position, for example, when loaded with a vehicle, the stinger member 402 of the tow truck is reinserted into the opening 116 of the extension member 114 and the frame 102 is lifted slightly to remove pressure from the locking pins 210. The locking pins 210 can be removed from the respective holes 122 and 124 and returned to the convenient pin holder 126. After the locking pins 210 are removed, the frame 102 can be lowered to the lowered position in a controllable fashion under motive force of the tow truck stinger member 402. Once in the lowered position, the locking pins 208 can be removed from the locking holes 312 of the hinged members 112 and returned to the convenient pin holder 126. The vehicle dolly 100 can then simply be pulled forward out from under the vehicle as the hinged members 112 will open and slide around the wheels of the vehicle.

In an alternative embodiment, the frame 102 is elevated to the raised position without the use of the tow truck. For example, the frame 102 may be elevated to the raised position with a motor or hydraulics. Alternatively still, the frame 102 may be elevated by use of a crank or ratchet mechanism relying on manual operation by the tow operator to raise the frame 102. In such an embodiment, a separate raised position locking mechanism may not be necessary as the system elevating the frame 102 may simply maintain the frame 102 in its raised position. Alternatively still, a raised position locking mechanism may also be used as a safety precaution.

In another alternative embodiment, the wheel assembly 104 may include the vertical sleeve 410 and the vertical portion 404 of the frame 102 may include the vertical sliding member 504. The vertical sleeve 410 and the vertical sliding member 504 may interface in the same manner (e.g., the vertical sliding member 504 is slidably captured within the vertical sleeve 410).

Guide tabs 412 are provided on the outer lateral member 306 toward the ends of the outer lateral member 306 to prevent torqueing or pivoting of the axle assemblies 104 relative to the frame 102 about the vertical sliding member 504. Such torqueing may occur, for example, when turning while the vehicle dolly 100 is in the raised position. Reducing the torqueing reduces wear and torqueing stress on the vertical sleeve 410, the vertical sliding member 504, and/or other assemblies or members.

FIG. 7 shows a top view of the hinged member 112 and FIG. 8 shows a side cross-sectional view of the hinged member 112. The hinged member 112 may include an elongated portion 701, which may be formed from hollow metal frame stock. The hinged member 112 may include top and bottom pivoting tabs 702 and 703, respectively, attached to the top and bottom surfaces of the elongated portion 701. The hinged member 112 may also include top and bottom locking tabs 704 and 705, respectively, attached to the top and bottom surfaces of the elongated portion 701. The hinged member 112 includes a pivot hole 706 in the top and bottom pivoting tabs 702, which corresponds to the pivot point 113. The hinged member 112 also includes a locking hole 312 in the top and bottom locking tabs 704, which align with the locking hole 314 of the frame 102 when the hinged member 112 is in the closed position. The top pivoting tab 702 may include a ratcheting tooth 708, which further includes a curved camming edge 710 and a straight locking edge 712, the operation of which is discussed below.

Figure 9:
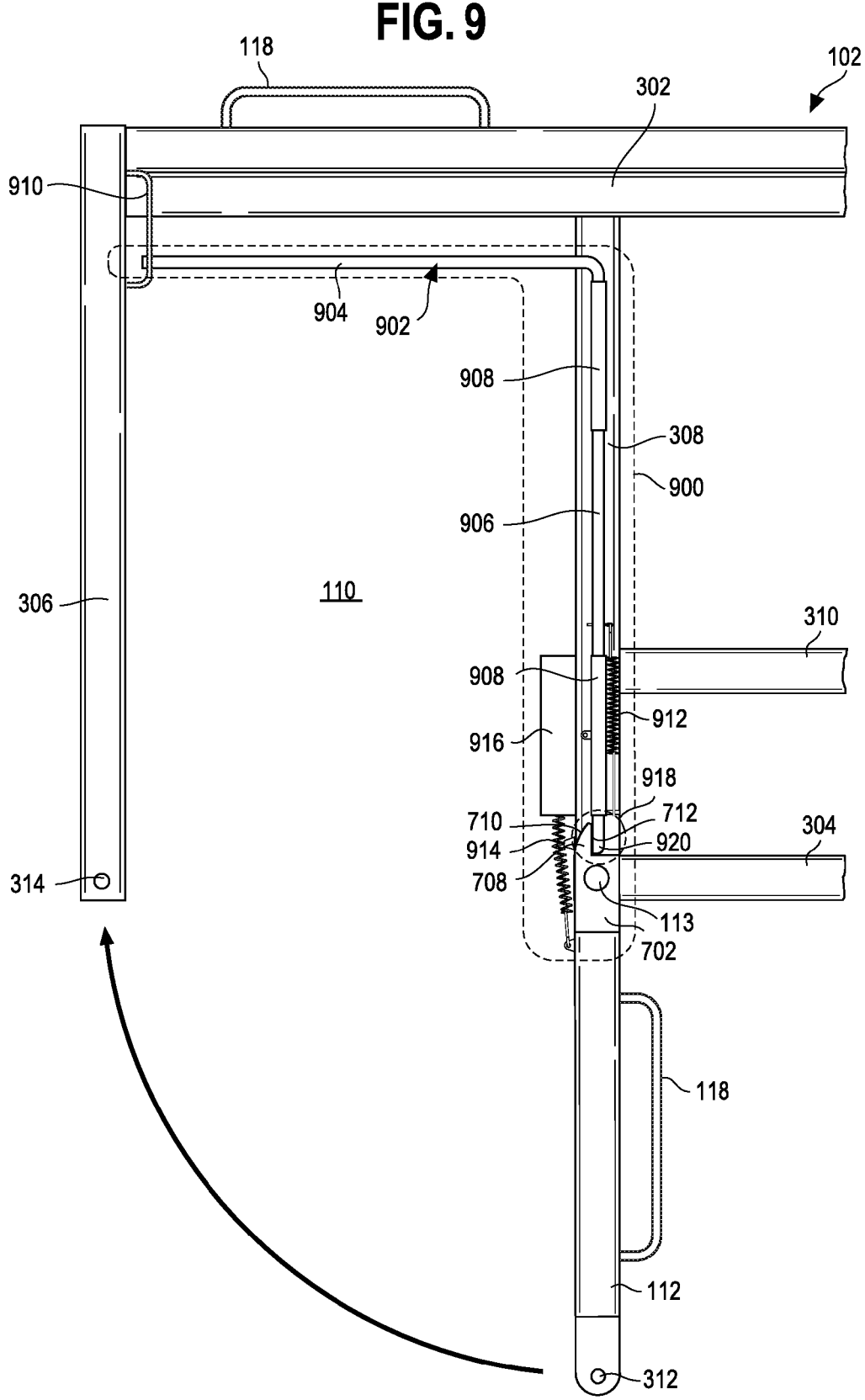
FIG. 9 shows a top view of a configuration and operation of a hinge activation device of the vehicle dolly of FIG. 1.
Figure 10:
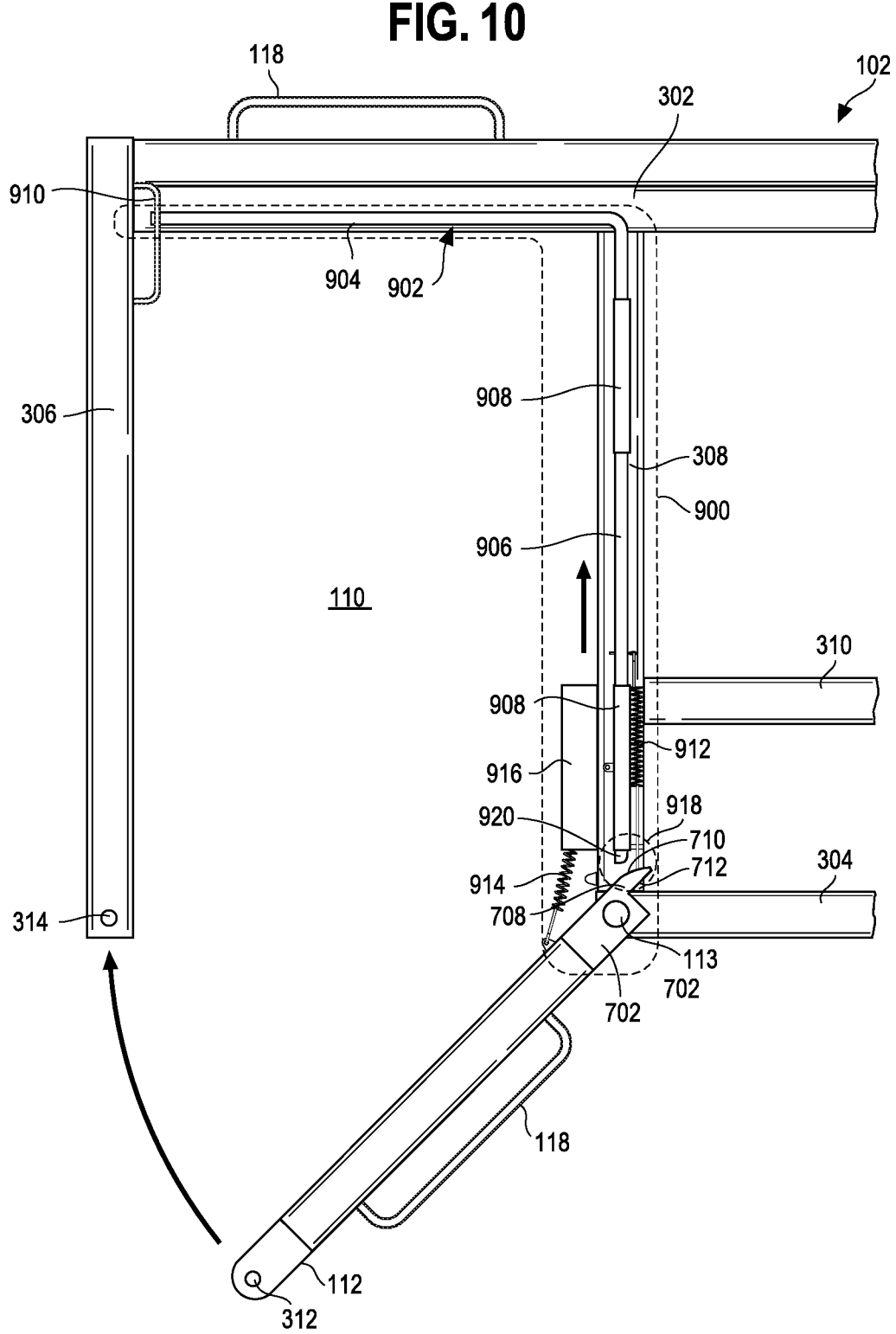
FIG. 10 shows another a top view of the configuration and operation of the hinge activation device of FIG. 9.
Figure 11:
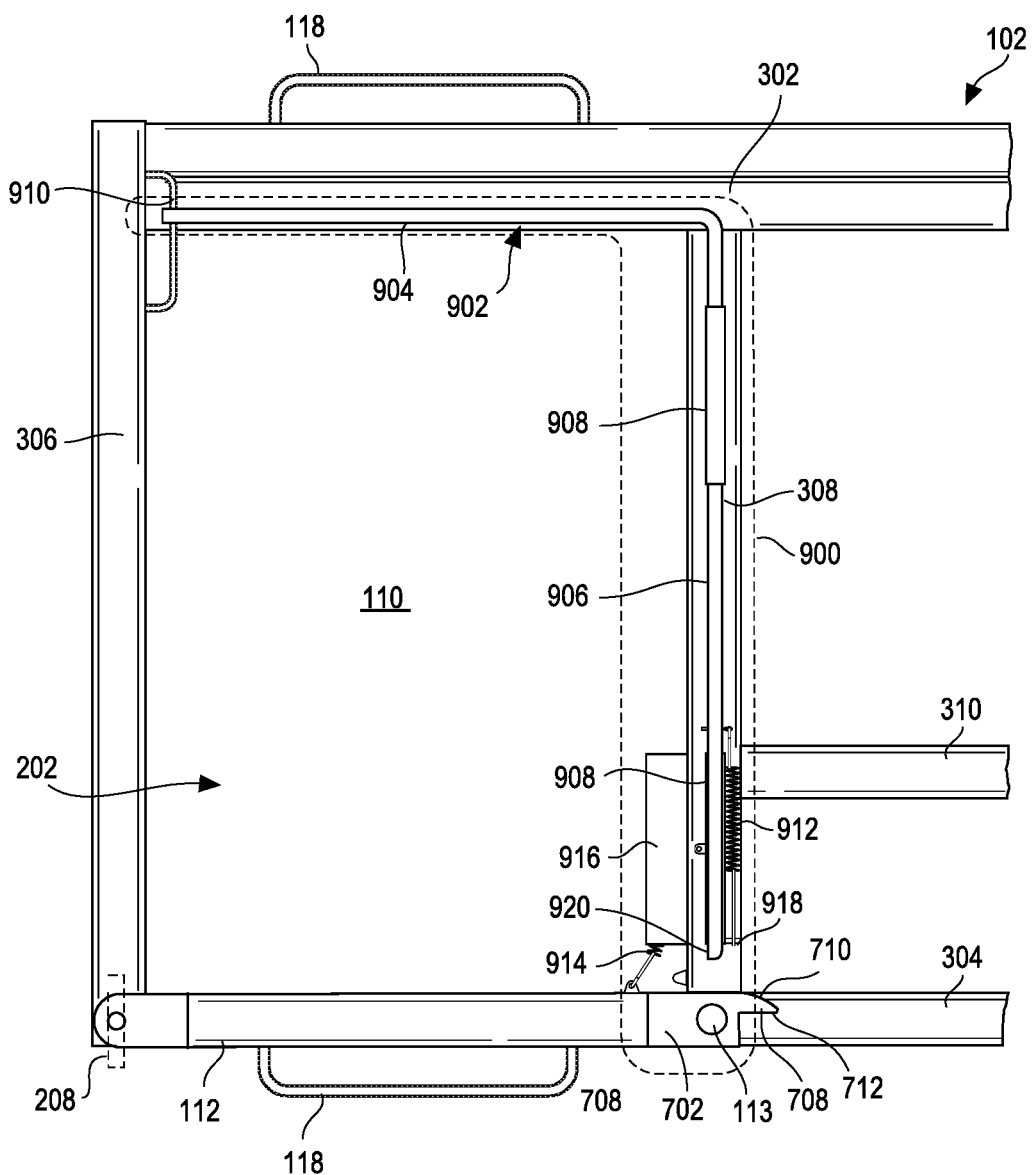
FIG. 11 shows another a top view of the configuration and operation of the hinge activation device of FIG. 9.

FIGS. 9, 10, and 11 show a top view of the configuration and operation of a hinge activation device 900 in accordance with various embodiments. FIGS. 9, 10, and 11 show the frame 102 forming the wheel cradle opening 110 with the hinged member 112 pivotally attached to the frame 102 at pivot point 113. The hinge activation device 900 is configured to contact the wheel of the vehicle received within the wheel cradle opening 110 and responsively move the hinged member 112 toward the closed position, as is illustrated in FIGS. 10 and 11.

In various embodiments, the hinge activation device 900 may be activated via an applied force. In one embodiment, the applied force may comprise a wheel contacting a portion of the hinge activation device 900, such as the wheel contacting wheel contacting member 902. In particular, the wheel contacting member 902 is configured to contact the wheel received within the wheel cradle opening 110 and the hinge activation device 900 as a whole responsively moves the hinged member 112 toward the closed position. In one embodiment, the wheel contacting member 902 is a rod or other elongated member that includes a transverse portion 904 and a longitudinal portion 906. The transverse portion 904 is configured to make physical contact with the wheel, while the longitudinal portion 906 runs from front to back along the wheel cradle opening 110. The transverse portion 904 spans the wheel cradle opening 110 from side to side and is located near the front member 302, which operates as one of the wheel cradle members of the wheel cradle 202. The transverse portion 904 is also opposite the hinged member 112 when the hinged member 112 is closed. Other types of forces are contemplated to activate hinge activation device 900.

The wheel contacting member 902 is held in place along the longitudinal portion 906 by one or more channels 908 running along the inner support member 308. The channels 908 allow the longitudinal portion 906 to slide forward and backward. A guide 910 holds and protects the end of the transverse portion 904 near the outer lateral member 306 while letting the transverse portion 904 slide forward and backward. In one embodiment, an activation device biasing member 912 applies a biasing force on the wheel contacting member 902 toward the hinged member 112. In one example, the activation device biasing member 912 is a tension spring that is connected between the inner support member 308 and/or channels 908 and the longitudinal portion 906 of the wheel contacting member 902 such that the wheel contacting member 902 is pulled backward toward the hinged member 112.

The transverse portion 904 exists within the wheel cradle opening 110 such that a wheel entering the wheel cradle opening 110 from back to front will contact the transverse portion 904. Thus, as the vehicle dolly 100 is backed up (while in the lowered position shown in FIG. 1 with the hinged members 112 in the open position) to receive within the wheel cradle openings 110 wheels of an axle of a vehicle parked on the ground, the wheel approaches and eventually contacts the transverse portion 904 of the wheel contacting member 902. The wheel contacts the transverse portion 904 before the wheel contacts the front member 302 of the frame 102. Further rearward movement of the vehicle dolly 100 should be halted when the wheels contact the wheel contacting members 902 and/or when the wheels contact the front member 302 of the frame 102.

In one embodiment, a hinged member biasing device 914 is connected between the hinged member 112 and the inner support member 308. The hinged member biasing device 914 applies a biasing force on the hinged member 112 relative to the frame 102 to bias the hinged member 112 to pivot toward the closed position. In one approach, the hinged member biasing device 914 is a tension spring that exerts a pulling force to pull the hinged member 112 toward the closed position. In one embodiment, a protective cover 916 surrounds all or part of the hinged member biasing device 914 to protect it from wheels entering or exiting the wheel cradle opening 110.

Figure 12:
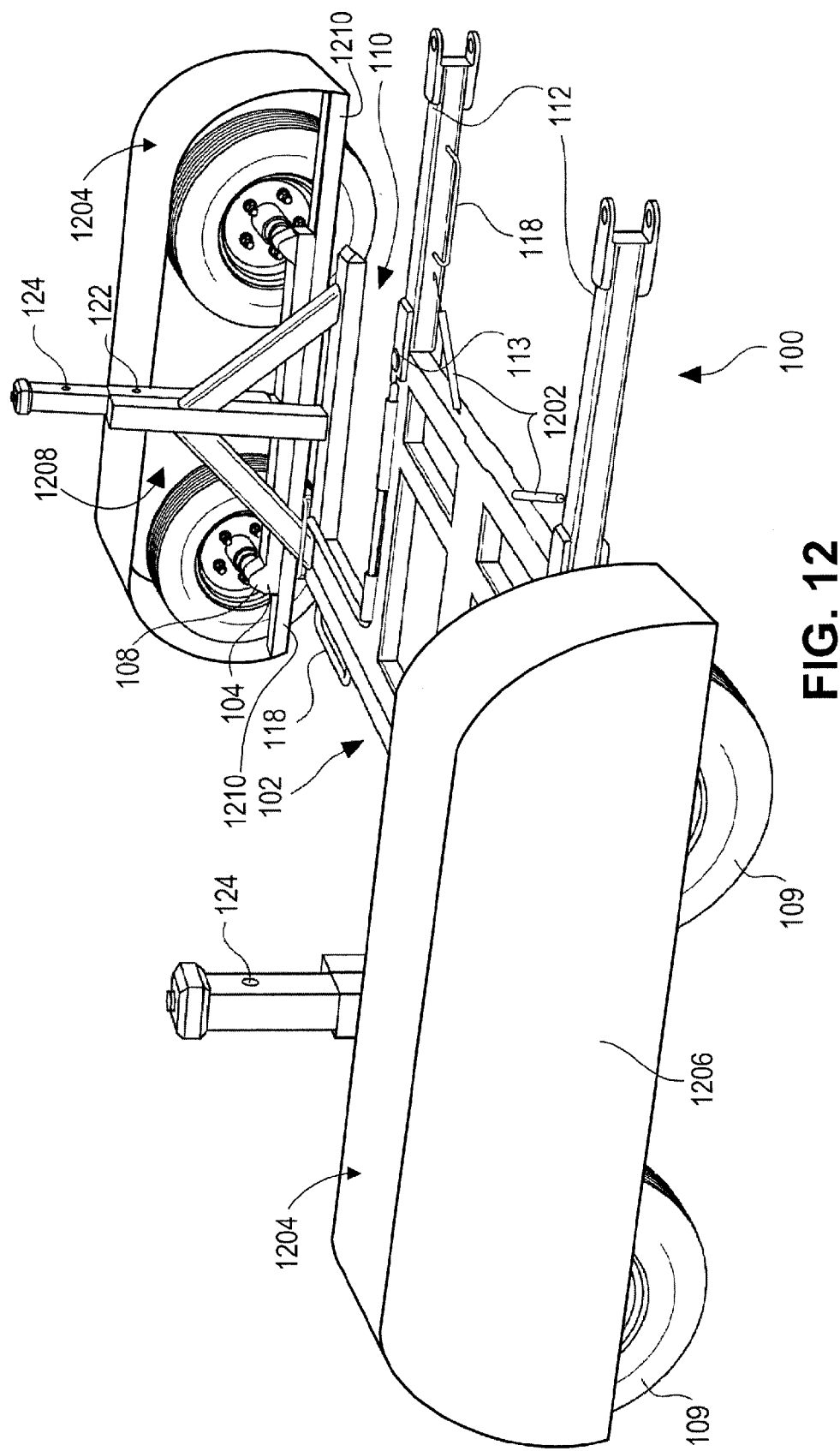
FIG. 12 shows another view of the example vehicle dolly of FIG. 1 including a splash guard.

In another embodiment, shown in FIG. 12, the hinged member biasing device 914 is a gas cylinder spring 1202 connected between the hinged member 112 and the back member 304. The gas cylinder spring 1202 is a pneumatic spring that exerts a biasing force on the hinged member 112 to pivot the hinged member 112 toward the closed position. Alternatively, the gas cylinder spring 1202 can be connected between the hinged member 112 and the inner support member 308, much like the tension spring embodiment discussed above.

Returning to FIGS. 9, 10, and 11, in one embodiment, the hinge activation device 900 also includes a latching mechanism 918. The latching mechanism 918 allows the hinged member 112 to pivot from the closed position to the open position and latches the hinged member 112 in the open position. In this manner, once the hinged member 112 is pivoted to the open position and the latching mechanism 918 latches, the hinged member 112 cannot pivot away from open position toward the closed position. This conveniently keeps the hinged members 112 in the open position while attempting to maneuver the vehicle dolly 100 under the vehicle to be towed. The hinge activation device 900 will, however, release the latching mechanism 918 to unlatch the hinged member 112 in response to contacting the wheel of the vehicle received within the wheel cradle opening 110. Once the latching mechanism 918 is released, the hinged member 112 is unlatched and can again pivot from the open position toward the closed position. In one approach, once the latching mechanism 918 is released, the hinged member 112 automatically moves toward the closed position by force of the hinged member biasing device 914.

In one embodiment, the latching mechanism 918 includes the ratcheting tooth 708 of the top pivoting tab 702 of the hinged member 112 interacting with an end 920 of the longitudinal portion 906 of the wheel contacting member 902. The tow operator may initiate a manual movement of the hinged members 112 from the closed position to the open position prior to backing the vehicle dolly 100 under the vehicle to be towed. When the hinged member 112 is in the closed position and is moved toward the open position (e.g., in the absence of a wheel in the wheel cradle opening 110), the camming edge 710 of the ratcheting tooth 708 engages a corresponding curved edge of the end 920 of the longitudinal portion 906 to push the wheel contacting member 902 forward as the hinged member 112 pivots toward the open position. Once the hinged member 112 is in the open position, the end 920 of the longitudinal portion 906 returns rearward (under force of the activation device biasing member 912) into a notch in the top pivoting tab 702 of the hinged member 122. The hinged member 112 cannot thereafter return to the closed position because of the interference between the locking edge 712 of the ratcheting tooth 708 and the side of the end 920 of the longitudinal portion 906 of the wheel contacting member 902 (as is shown in FIG. 9).

With reference to FIG. 9, as a wheel enters the wheel carrier opening 110 and pushes the transverse portion 904 of the wheel contacting member 902 forward, the end 920 of the longitudinal portion 906 of the wheel contacting member 902 moves forward until it no longer interferes with the locking edge 712 of the ratcheting tooth 708. Thereafter, the hinged member 112 can return toward the closed position. As discussed above, in certain embodiments, the hinged member 112 will automatically move toward the closed position under force of the hinged member biasing device 914.

So configured, the hinge activation device 900 automatically moves the hinged members 112 toward the closed position when the hinge activation device 900 contacts a wheel of the vehicle received within the wheel cradle opening 110. Because the hinged members 112 are located under the center of the vehicle when the frame 102 is slid under the vehicle, it would be difficult and inconvenient to close the hinged members 112 as the tow operator would have to reach far under the center of the vehicle to grab and close the hinged members 112. By automatically moving the hinged members 112 toward the closed position when the hinge activation device 900 contacts a wheel, the tow operator's task is safer and much more convenient as the tow operator may only need to, for example, close the hinged member 112 the small remaining distance and/or insert the locking pin 208 into the aligned locking holes 312, 314 to lock the hinged member 112 in the closed position, as is shown in FIG. 11. The tow truck operator can conveniently perform these operations from the side of the vehicle with little to no obstructions. Once the hinged member 112 is locked in the closed position, the wheel cradle 202 is formed and can be used to elevate and support the wheel of the vehicle captured within the wheel cradle opening 110.

In alternative embodiments, the hinge activation device 900, the wheel contacting member 902, and/or the latching mechanism 918 is powered by motors or hydraulics and is responsive to an electrical input, such as an electrical input generated by activation of a manual switch, electrical contact sensors, optical sensors, or other contact sensing device types instead of a mechanical solution as discussed above. Many variations are possible for the hinge activation device 900, the wheel contacting member 902, and/or the latching mechanism 918.

The frame 102, wheel assemblies 104, and other portions may be formed of suitable materials, such as, for example, aluminum, steel, iron, carbon fiber, or another rigid material capable of withstanding the stresses imposed by the weight of vehicles. In certain embodiments, the various members are formed from segments of hollow or solid extruded metal frame stock (e.g., 2" metal frame stock). The various sections and members may be welded together, bolted together, or otherwise interconnected, or cast as a single or multiple assemblies that are coupled together.

FIG. 12 shows another view of the vehicle dolly 100. In one embodiment, the vehicle dolly 100 includes a wheel fender 1204. The wheel fender 1204 may operate as a shroud or splash guard to prevent water or road debris from being thrown up onto a vehicle being towed, which might otherwise damage or dirty the vehicle being towed. In one embodiment, the wheel fender 1204 includes a closed exterior panel 1206, as is shown in FIG. 12. In another embodiment, the side of the wheel fender 1204 is open such that the wheels 109 can be viewed or accessed. In another embodiment, the wheel fender 1204 forms an inner opening 1208 such that the wheels 109 can be viewed or accessed from the inner side of the dolly 100. Alternatively, the inner side of the wheel fender 1204 may include an inner panel, similar to outer panel 1206. The wheel fender 1204 may be connected to the axle assembly 104. For example, the wheel fender 1204 may be connected to an extension frame member 1210 connected to the wheel support member 502. The extension frame member 1210 may be a horizontal member that is welded, bolted, or otherwise connected to the bottom of or side of the wheel support member 502. Alternatively, the wheel support member 502 may be extended forward and rearward to provide support to the wheel fender 1204. The wheel fender 1204 may also include an exterior or interior frame or other structural elements to provide support for the protective panels of the wheel fender 1204. The wheel fender 1204 may remain disconnected and clear of the vertical sliding member 504 such that the vertical sliding member 504 may slide upward and downward freely relative to both the wheel assembly 104 and the wheel fender 1204.

Various implementations have been specifically described. However, many other implementations are also possible.

What is claimed is:

1. A vehicle dolly comprising:
    an axle assembly;
    a frame comprising a wheel cradle configured to receive and support a wheel of a vehicle, the frame vertically slidably coupled to the axle assembly such that the frame is configured to slide upward relative to the axle assembly to a raised position under motive force exerted by a tow truck and to slide downward relative to the axle assembly to a lowered position;
    a wheel rotatably connected to the axle assembly and configured to support the axle assembly and the frame on a support surface; and
    an extension member connected to the frame and configured to receive a tow truck stinger member of the tow truck.

2. The vehicle dolly of claim 1 wherein at least one of the frame or the axle assembly further comprises a vertical sleeve and wherein the other of the frame or the axle assembly further comprises a vertical sliding member slidably captured within a sleeve portion, the vertical sliding member configured to slide within the vertical sleeve and relative to the vertical sleeve.

3. The vehicle dolly of claim 2 wherein the fame frame comprises the vertical sleeve and the axle assembly comprises the vertically sliding member.

4. The vehicle dolly of claim 2 wherein the frame further comprises a horizontal portion connected to the vertical sleeve.

5. The vehicle dolly of claim 1 wherein the frame is lockable in the raised position relative to the axle assembly.

6. The vehicle dolly of claim 1 wherein the frame is configured to slide upward relative to the axle assembly to a raised position under motive force exerted by a tow truck.

7. The vehicle dolly of claim 1 wherein the frame is configured to slide under a vehicle while in the lowered position and raise the vehicle off of a support surface while in a raised position.

8. The vehicle dolly of claim 1 wherein the wheel rotatably connected to the axle assembly is further configured to:
    support the frame elevated a first distance from the support surface in the lowered position; and
    support the frame elevated a second distance from the support surface in the raised position, the second distance being greater than the first distance.

9. A vehicle dolly comprising:
    an axle assembly;
    a frame comprising a wheel cradle configured to receive and support a wheel of a vehicle, the frame vertically slidably coupled to the axle assembly such that the frame is configured to slide upward relative to the axle assembly to a raised position and to slide downward relative to the axle assembly to a lowered position, wherein the frame is lockable in the raised position relative to the axle assembly; and
    a wheel rotatably connected to the axle assembly and configured to support the axle assembly and the frame on a support surface; and
    a removable pin configured to lock the frame in the raised position relative to the axle assembly.

10. A vehicle dolly comprising:
    an axle assembly;
    a frame comprising a wheel cradle configured to receive and support a wheel of a vehicle, the frame vertically slidably coupled to the axle assembly such that the frame is configured to slide upward relative to the axle assembly to a raised position and to slide downward relative to the axle assembly to a lowered position; and a wheel rotatably connected to the axle assembly and configured to support the axle assembly and the frame on a support surface, wherein at least one of the frame or the axle assembly further comprises a vertical sleeve;

wherein the other of the frame or the axle assembly further comprises a vertical sliding member, the vertical sliding member configured to slide within the vertical sleeve and relative to the vertical sleeve;

wherein the frame further comprises:

a horizontal portion connected to the vertical sleeve; and at least one angular bracing member attached to the horizontal portion of the frame and configured to stabilize the horizontal portion of the frame relative to the vertical sleeve.

11. A vehicle dolly comprising:

an axle assembly;

a frame comprising a wheel cradle configured to receive and support a wheel of a vehicle, the frame vertically slidably coupled to the axle assembly such that the frame is configured to slide upward relative to the axle assembly to a raised position and to slide downward relative to the axle assembly to a lowered position;

a wheel rotatably connected to the axle assembly and configured to support the axle assembly and the frame on a support surface;

at least one hinged member; and a hinge activation device configured to apply a force, responsive to activation, to the at least one hinged member, wherein the at least one hinged member is coupled to the frame and, responsive to the force from the hinge activation device, configured to pivot between an open position and a closed position, wherein the hinge activation device is configured to be activated responsive to an applied force due to contact of a wheel of the vehicle received within the wheel cradle, wherein when the hinged member is in the closed position, the wheel cradle is at least partially defined by the hinged member and wherein the wheel cradle at least partly encircles the wheel of the vehicle.

12. The vehicle dolly of claim 11 wherein the hinge activation device comprises a wheel contacting member, the wheel contacting member comprises a transverse portion configured to make contact with the wheel of the vehicle and a longitudinal portion, the longitudinal portion perpendicular to the transverse portion.

13. The vehicle dolly of claim 12 wherein the hinge activation device comprises a channel; and wherein the longitudinal portion slides in the channel.

14. The vehicle dolly of claim 12 wherein the hinge activation device comprises a guide; and wherein the guide protects an end of the transverse portion while allowing the transverse portion to slide.

15. The vehicle dolly of claim 11 wherein the hinge activation device comprises a wheel contacting member and a biasing member, the wheel contacting member configured to contact of the wheel of the vehicle received within the wheel cradle in order to activate the hinge activation device, the biasing member configured to bias the wheel contacting member toward the at least one hinged member.

16. The vehicle dolly of claim 15 wherein the biasing member comprises a spring.

17. The vehicle dolly of claim 16 wherein the spring is configured to pull the wheel contacting member toward the at least one hinged member.

* * * * *